United States Patent Office 3,813,378
Patented May 28, 1974

3,813,378
PROCESS FOR THE PRODUCTION OF CYCLIC IMIDIC ACID ESTERS
Helmut Witte, and Wolfgang Seeliger, Marl, Germany, assignors to Chemische Werke Huls Aktiengesellschaft, Marl, Germany
No Drawing. Filed June 2, 1972, Ser. No. 259,310
Claims priority, application Germany, June 4, 1971, 21 27 776.9; Nov. 24, 1971, 21 58 061.0
Int. Cl. C07d 85/36, 87/20
U.S. Cl. 260—244                                6 Claims

ABSTRACT OF THE DISCLOSURE $\Delta^2$-oxazolines and 5,6-dihydro-4H-1,3-oxazines are produced by heating an organic nitrile and a $\beta$- or $\alpha$- aminoalkanol, at 50–180° C. in the presence of a salt soluble in the reaction mixture of lithium, copper, calcium, zinc, cadmium, manganese, nickel or cobalt and removing the ammonia by-product from the reaction mixture.

BACKGROUND OF THE INVENTION

It is conventional to produce cyclic imidic acid esters from N-(2-hydroxyalkyl)-carboxylic acid amides or from N-(3-hydroxy-alkyl)-carboxylic acid amides by heating or by reaction first with an acid chloride and thereafter with a base. See W. Seeliger et al., "Angew. Chem."*78*, 913 (1966). 4H-5,6-dihydrooxazines can also be obtained by reacting N-hydroxymethylcarboxylic acid amides with olefins. See W. Seeliger, W. Diepers, "Liebigs Ann. Chem." *697*, 171–180 (1966). In both such processes, several complicated process steps are required.

It is known from U.S. Pat. 3,488,294 to reduce the corrosin of ferrous metals and alloys thereof with the aid of compounds containing, inter alia, $\Delta^2$-oxazoline- or 4H-5,6-dihydrooxazine-1,3 groups and produced by the reaction of polymers containing nitrile groups with amino alcohols in the presence of a catalyst, e.g., sodium methylate. However, this catalyst is unsuitable, as shown hereinafter in Comparative Examples 3 and 4, for the production of monomeric imidic acid esters in satisfactory yield and with a high conversion. It is known that metal alcoholates, at higher temperatures, also catalyst the polymerization of nitriles (D. Wöhrle, G. Manecke, "Makromolekulare Chemie" *138* (1970), 284, so that more or less inhomogeneous reaction products are obtained.

It is an object of this invention to overcome the disadvantages of the relevant state of the art. Other objects will be apparent to those skilled in the art to which this invention pertains.

SUMMARY OF THE INVENTION

Cyclic imidic acid esters are produced by heating an organic nitrile and a $\beta$- or $\alpha$- aminoalkanol, in the presence as reaction catalyst of a salt of lithium, copper, calcium zinc, cadmium, manganese, nickel or cobalt, which is soluble in the reaction mixture.

DETAILED DISCUSSION

A wide variety of organic nitriles can be employed as starting materials, including both aliphatic and aromatic and mono-, di- and polynitriles. Obviously, the organic group should not contain a substituent which is reactive toward the aminoalkanol or metal salt employed in the reaction. Because only mild heating is required, and a reaction solvent is not required, the stability of the nitrile does not ordinarily present any difficulties.

The following are preferred classes of organic nitriles:
(a) Aliphatic carboxylic acid mononitriles of the general Formula I

R—C≡N    I wherein R is straight-chain or branched alkyl or optionally substituted cycloalkyl of 1–22 carbon atoms, aralkyl of 7–10 carbon atoms, optionally substituted aryl of 6 or 10 ring carbon atoms, or a heterocyclic ring of 4–9 carbon atoms;
(b) Aliphatic dicarboxylic acid dinitriles of the general Formula II

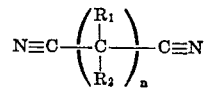

wherein $R_1$ and $R_2$, which can be alike or each are hydrogen atom or methyl, and $n$ is an integer from 3 to 19, inclusive;
(c) Cycloaliphatic dicarboxylic acid dinitriles of the general Formula III

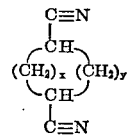

wherein $x$ is an integer from 1 to 3, inclusive, and $y$ is the integer 1 or 2; and
(d) Aryl dinitriles whose aryl groups contain 6 or 10 ring carbon atoms and whose nitrile groups are separated from each other by at least 3 carbon atoms.

Examples of alkanoic acid nitriles of Formula I are acetonitrile, propionitrile, butyronitrile, isobutyronitrile, n-valeronitrile, pivalonitrile, capronitrile, caprylic acid nitrile, capric acid nitrile, lauric acid nitrile, palmitic acid nitrile and stearic acid nitrile. Examples of cycloalkanoic acid nitriles of Formula I are those containing 3–8 preferably 5 or 6 ring carbon atoms, optionally substituted by 1,2 or more alkyl groups of 1–4 carbon atoms, e.g., methyl, including cyclohexanecarboxylic acid nitriie, 4-methylcyclohexanecarboxylic acid nitrile and cyclopentanecarboxylic acid nitrile. Examples of aralkyl nitriles are those wherein alkyl is of 1–4 carbon atoms and aryl is phenyl, naphthyl or alkaryl as defined below, e.g., benzyl cyanide. Examples of aryl nitrile are phenyl, naphthyl and the corresponding groups substituted by 1,2 or more simple substituents, e.g., alkyl of 1–4 carbon atoms, alkoxy of 1–4 carbon atoms, halo, nitro, etc., including benzonitrile, p-tolunitrile, p-chlorobenzonitrile, m-chlorobenzonitrile, $\alpha$-naphthonitrile and $\beta$-naphthonitrile. Examples of heterocyclic nitrile are rings containing 5 or 6 ring members, of which 1,2 or 3 are N, S and/or O, e.g., 3-cyanopyridine, 3-cyanochinoline and 2-cyanothiophene.

In the compounds of general Formula II, identical or different $R_1$ and/or $R_2$ groups can be arranged in the

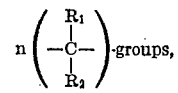

i.e., $R_1$ and $R_2$ both are hydrogen, $R_1$ and $R_2$ both are methyl, and $R_1$ is hydrogen and $R_2$ is methyl, and/or $R_1$ is methyl and $R_2$ is hydrogen.

Especially suitable as organic nitriles in the process of this invention are aliphatic dicarboxylic acid nitriles of the general Formula II wherein $R_1$ and $R_2$ each are hydrogen atoms and those wherein $n$ is an integer from 4 to 10, or both.

Examples of aliphatic dicarboxylic acid of the general Formula II are adipic acid dinitrile, pimelic acid dinitrile, suberic acid dinitrile, acelaic acid dinitrile, sebacic acid dinitrile, undecanedioic acid (1,11)-dinitrile, dodecanedioic acid (1,12)-dinitrile, 2,2,4-trimethyladipic acid dinitrile, and 2,4,4-trimethyladipic acid dinitrile.

In the process of this invention, preferred cycloaliphatic dicarboxylic acid nitriles of the general Formula III are those wherein the sum of $x$ and $y$ is 4, e.g., hexahydroterephthalic acid dinitrile and hexahydroisophthalic acid dinitrile.

Examples of aryl dinitriles are those wherein the aryl groups as defined above. Especially suitable aryl dinitriles for the process of this invention are terephthalic acid dinitrile and isophthalic acid dinitrile.

A preferred class of aminoalkanols are those of the general Formula IV

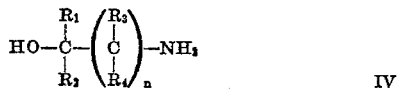

$$\text{HO}-\underset{R_2}{\overset{R_1}{C}}-\left(\underset{R_4}{\overset{R_3}{C}}\right)_n-\text{NH}_2 \qquad \text{IV}$$

wherein $R_1$, $R_2$, $R_3$ and $R_4$, which can be alike or different, each are a hydrogen atom or alkyl of 1–4 carbon atoms and $n$ is the integer 1 or 2.

Amino alcohols which are especially preferable are ethanolamine, 2-amino-1-propanol, 1-amino-2-propanol, 1-amino-3-propanol and 1-amino-3-butanol.

The process of this invention is conducted in the presence, as a catalyst, of a metallic salt soluble in the reaction medium, the cation of which is lithium, copper, calcium, zinc, cadmium, manganese, nickel or cobalt.

A characteristic property of the metals of these catalytically effective metallic salts is that they all form complexes with suitable nitrogen bases, even in the presence of hydroxyl ions, for example amines in water. See A. A. Grinberg, "Einfuehrung in die Chemie der Komplexverbindungen," The Chemistry of Complex Compounds, (VEB Verlag Technik publishers), Berlin, 1955, pp. 346 et seq. Suitable anions of the metallic salts are all those which convey a sufficient solubility of the salt in the reaction medium, so that a catalytic effect can be manifested. Examples of such anions are chloride, bromide, iodide, acetate and other carboxylate, e.g., lower-alkanoate ions, as well as the anion of acetylacetone.

Examples of such catalytically active metallic salts are lithium chloride, copper (II) sulfate, calcium chloride, zinc chloride, zinc bromide, zinc iodide, zinc acetate, cadmium acetate, manganese acetate, nickel acetate and cobalt acetate.

The metallic salts are catalytically effective in trace amounts. However, $10^{-5}$ to $10^{-1}$ mol of metallic salt per mol of nitrile group is preferably employed. In general, the metallic salts retain their catalytic effectiveness beyond the end of the reaction, so that they can be utilized repeatedly in the batchwise conductance of the process, for example in the form of the distillation residue, without regeneration.

The process of the present invention can be conducted batchwise or continuously.

In the process of the invention, the starting components, nitrile and amino alcohol, are generally used in a ratio such that no amino alcohol is present at the termination of the reaction. This can be achieved, for example, by employing 0.5–1.0 mole of amino alcohol per mol of nitrile group. The amino alcohol can be added all at once, at the beginning of the reaction, or in portions during the course of the reaction.

The process of this invention is conducted at an elevated temperature, preferably of 50 to 180° C., more preferably 70 to 130° C.

The process of the present invention can be conducted at ambient, elevated or reduced pressure.

In order to achieve optimum yields, the ammonia produced in the reaction must be removed. Thus, conducting the reaction under reduced pressure can be advantageous because the thus-formed ammonia is thereby immediately removed from the reaction medium. The ammonia can also be removed with a stream of an inert gas, e.g., nitrogen.

The process of this invention is conveniently conducted in the absence of a reaction solvent. However, if a nitrile is employed or the thus-produced imidic acid ester exhibits poor solubility in the reaction mixture, an inert solvent, e.g., chlorobenzene, can be employed as a solubilizer.

The reaction products are worked up in many cases by distillation under ambient or reduced pressure. The content of cyclic imidic acid esters in the distillates can be determined with the aid of gas chromatography, by quantitative infrared spectroscopy, or by precipitation, for example with picric acid. The imidic acid esters can be obtained in the pure form in accordance with the customary methods of organic chemistry, for example by fractional distillation or crystallization. A fine purification by distillation or recrystallization can follow these methods.

The cyclic imidic acid esters produced in accordance with the present invention can be utilized as anticorrosive agents, as selective solvents, e.g., for the isolation of butadiene, isoprene, or acetylene from hydrocarbon mixtures, and as antistats.

2-alkyl- and aryl-$\Delta^2$-oxazolines obtained according to the present invention in most cases do not contain chain-terminating compounds and can be polymerized, in accordance with DAS [German Published Application] 1,206,585, with an alkylating agent, e.g., diethyl sulfate as the catalyst, to poly-[N-acyl]-ethylenimines.

The process of this invention makes posible the production of cyclic imidic acid esters from commercially readily obtainable starting substances, employing few and simple process steps in good yields and with high conversions. This is surprising because it was know that the reaction of aromatic and aliphatic nitriles in the presence of approximately equimolar amounts of metal chlorides or phosphorus chlorides, e.g., zinc chloride, results in $\Delta^2$-imidazolines. See "Monatshefte fuer Chemie" 80 (1949), 815. Also, the reaction of dicyan with amino alcohols did not lead to the formation of cyclic imidic acid esters. See J. Org. Chem. (London) 23 (1958), 819.

Without further elaboration, it is believed that one skilled in the art can, using the preceding description, utilize the present invention to its fullest extent. The following preferred specific embodiments are, therefore, to to be construed as merely illustrative, and not limitative of the remainder of the disclosure in any way whatsoever. In the experiments described in the following examples formed ammonia is but partially soluble in the reaction medium and is removed by a stream of nitrogen passing through the reaction vessel.

EXAMPLE 1

103 g. (1 mol) of benzonitrile is heated under a nitrogen atmosphere with 61 g. (1 mol) of ethanolamine and 6.6 g. of $Cd(CH_3COO)_2 \cdot 2H_2O$ (0.025 mol) for 25 hours to 130° C. The reaction residue is distilled, yielding 121 g. of 2-phenyl-$\Delta^2$-oxazoline (B.P. 106–112° C./mm.; $n_D^{20}=1.5657$), which corresponds to a yield of 83% of theory. The conversion is 99%.

EXAMPLE 2

103 g. of benzonitrile, 61 g. of ethanolamine, and 6.1 g. of $Mn(CH_3COO)_2 \cdot 4H_2O$ are heated under a nitrogen atmosphere to 130° C. for 25 hours. From the reaction residue, one obtains 124.5 g. of a distillate having the boiling point range of 85–125° C./18 mm. The gas-chromatographical analysis of this product indicates a content of 110.5 g. of 2-phenyl-$\Delta^2$-oxazoline, corresponding to a yield of 82% of theory, based on the benzonitrile reacted, at a conversion of 92%.

EXAMPLES 3–7

In accordance with the mode of operation set forth in Example 1, distillates containing 2-phenyl-$\Delta^2$-oxazoline are obtained from 103 g. of benzonitrile, 61 g. of ethanolamine, and with the catalysts set out in the table below.

| Ex. | Catalyst | Content of 2 phenyl-Δ² oxazoline in distillate (g.) | Yield (percent) (based on nitrile reacted) | Conversion (percent) |
|---|---|---|---|---|
| 3 | 0.42 g. ZnCl₂ | 118 | 89 | 90 |
| 4 | 5.6 g. ZnBr₂ | 110 | 80 | 93 |
| 5 | 5.5 g. Zn(CH₃COO)₂·2H₂O | 121 | 85 | 96 |
| 6 | 1.1 g. LiCl | 96.5 | 73 | 89 |
| 7 | 5.7 g. CuSO₄ | 94 | 78 | 81.5 |

In order to examine the purity of the 2-phenyl-Δ²-oxazoline produced according to Example 3, the product was once again purified by fractional distillation and then polymerized (50 g.) with 0.089 ml. of diethyl sulfate as the catalyst at 130° C. for 8 hours. The polymer exhibited a reduced solution viscosity $\eta_{red}$ of 0.56 (0.5% solution in m-cresol), thus proving the absence even of traces of chain-terminating compounds.

EXAMPLE 8

In accordance with the procedure of Example 1, a distillate containing 125 g. of 2-phenyl-Δ²-oxazoline is obtained from 206 g. (2 mol) of benzonitrile, 61 g. (1 mol) of ethanolamine, and 3.4 g. ZnCl₂. This corresponds to a yield of 85% of theory, based on 1 mol of reacted benzonitrile, with a conversion of 100%.

EXAMPLE 9

According to the method used in Example 1, a distillate with a boiling range of 50–80° C./0.2 mm. and containing 53 g. of 2-(p-tolyl)-Δ²-oxazoline is produced from 58.5 g. of p-tolunitrile, 30.5 g. of ethanolamine, and 1.7 g. of ZnCl₂, corresponding to a yield of 73% of theory, based on the reacted p-tolunitrile, with a conversion of 89%. A portion of the 2-(p-tolyl)-Δ²-oxazoline is crystallized from the distillate and can be recrystallized from cyclohexane; M.P. 63–67° C.

EXAMPLE 10

In accordance with the mode of operation of Example 1, a distillate is obtained from 103 g. of benzonitrile, 75 g. of 1-amino-3-propanol, and 3.4 g. of ZnCl₂ which has a boiling range of 87–148° C./18 mm. and contains 118.5 g. of 2-phenyl-5,6-dihydro-4H-1,3-oxazine. This corresponds to a yield of 78% of theory, based on reacted benzonitrile, with a conversion of 94%. By fractional distillation, a fraction of pure 2-phenyl-5,6-dihydro-4H-1,3-oxazine is obtained which boils at 146–148° C./18 mm.

EXAMPLE 11

According to the method of Example 1, a distillate is obtained from 103 g. of benzonitrile, 75 g. of 1-amino-2-propanol, and 3.4 g. of ZnCl₂ which has a boiling range of 41–80° C./0.4 mm. and contains 130 g. of 2-phenyl-5-methyl-Δ²-oxazoline. This corresponds to a yield of 88% of theory, based on reacted benzonitrile, with a conversion of 91%. By fractional distillation, a pure fraction of the oxazoline is obtained, passing over at 73–76° C./0.4 mm.

EXAMPLE 12

According to the mode of operation described in Example 1, 49 g. of a distillate is produced from 52 g. of 3-cyanopyridine, 30.5 g. of ethanolamine, and 1.7 g. of ZnCl₂ which has a boiling point of 71–90° C./0.2–0.4 mm. and consists of pure 2-(3-pyridyl)-Δ²-oxazoline; this product solidifies after a short period of time; M.P. 68–69° C. The yield is 66% of theory, with a conversion of 100%.

EXAMPLE 13

According to the method of Example 1, a distillate is obtained from 77 g. of α-naphthonitrile, 30.5 g. of ethanolamine, and 1.7 g. of ZnCl₂ having a boiling range of 90–135° C./0.1 mm., this distillate containing 41.5 g. of 2-(1-naphthyl)-Δ²-oxazoline, corresponding to a yield of 58% of theory, based on the reacted α-naphthonitrile. The conversion amounts to 72%. By fractional distillation, a fraction of the pure oxazoline is obtained which solidifies; M.P. 41–43° C.

EXAMPLE 14

According to the procedure of Example 1, a distillate is obtained from 110 g. of propionitrile, 122 g. of ethanolamine, and 6.8 g. of ZnCl₂ which has a boiling range of 115–134° C./760 mm. This product contains 112 g. of 2-ethyl-Δ²-oxazoline, corresponding to a yield of 60% of theory, based on the propionitrile reacted. The conversion is 94%. A fraction of the pure oxazoline boils at 129–130° C./760 mm.

EXAMPLE 15

In accordance with the method used in Example 1, a distillate having the boiling range of 54–150° C./0.3–0.6 mm. is obtained from 117 g. of benzyl cyanide, 61 g. of ethanolamine, and 5.5 g. of Zn(CH₃COO)₂·2H₂O, containing 95 g. of 2-benzyl-Δ²-oxazoline, corresponding to a yield of 60% of theory, based on the reacted benzyl cyanide. The conversion amounts to 99%. By fractional distillation, a fraction of the pure oxazoline is obtained having a boiling point of 75–80° C. 0.4 mm.

EXAMPLE 16

According to the mode of operation of Example 1, a distillate of a boiling range of 55–187° C./10 mm. is produced from 71.5 g. of capronitrile, 42.5 g. of ethanolamine, and 4.11 g. of Zn(CH₃COO)₂·2H₂O, containing 65 g. of 2-n-pentyl-Δ²-oxazoline, corresponding to a yield of 65% of theory, based on reacted capronitrile. The conversion is 96%. A fraction of the pure oxazoline passes over at 70–75° C./10 mm.

EXAMPLE 17

According to the procedure described in Example 1, a distillate is obtained from 125 g. of cyclohexanecarboxylic acid nitrile, 70 g. of ethanolamine, and 6.3 g. of Zn(CH₃COO)₂·2H₂O with a boiling range of 59–95° C./9 mm., containing 119.5 g. of 2-cyclohexyl-Δ²-oxazoline, corresponding to a yield of 72% of theory, based on reacted cyclohexyl cyanide. The conversion is 95%. A fraction of the pure oxazoline passes over at 85–90° C./9 mm.

EXAMPLE 18

Under a nitrogen atmosphere, 82 g. of anhydrous acetonitrile is heated under reflux with 122 g. of ethanolamine and 6.8 g. of ZnCl₂ for 25 hours. During the course of the reaction, the temperature of the vapor phase rises from 82° C. to 112° C., so that the bath temperature must be controlled. The distillation of the reaction charge yields 116 g. of distillate having a boiling point of 105–111° C./760 mm. with a content, determined by gas chromatography, of 111 g. of 2-methyl-Δ²-oxazoline, corresponding to a yield of 65% of theory. The conversion amounts to 100%.

EXAMPLE 19

Under a nitrogen atmosphere, 82 g. of anhydrous acetonitrile, 150 g. of 1-amino-2-propanol, and 13.6 g. of ZnCl₂ are heated under reflux for 41 hours. By fractional distillation, 124 g. of 2,5-dimethyl-Δ²-oxazoline is obtained, B.P. 118–119° C./760 mm., corresponding to a yield of 67% of theory, based on the reacted acetonitrile. The conversion is 94%.

EXAMPLE 20

Under nitrogen, 82 g. of anhydrous acetonitrile, 150 g. of 1-amino-3-propanol, and 26.4 g. of $$Cd(CH_3COO)_2 \cdot 2H_2O$$

are heated under reflux for 27 hours. From the residue of the reaction, one obtains a distillate of a boiling range of 125–135° C., containing 113 g. of 2-methyl-5,6-dihydro-4H-1,3-oxazine. The yield, based on reacted acetonitrile, is 60% of theory; the conversion is 96%.

EXAMPLE 21

Under a nitrogen atmosphere, 53 g. of stearic acid nitrile, 12.2 g. of ethanolamine, and 1.1 g. of $$Zn(CH_3COO)_2 \cdot 2H_2O$$

are heated to 130° C. for 24 hours. After cooling to 70° C. 250 ml. of benzene is introduced into the reaction medium. Then the reaction mixture is decanted in the hot state of the low-solubility material and left at 10° C. for 24 hours. The thus-formed precipitate is removed by filtration, and the solution is distilled. A fraction is obtained having a boiling range of 155–167° C./0.2 mm. and a melting point of 38–41° C., and containing 35.8 g. of n-heptadecyl-$\Delta^2$-oxazoline. The yield is 58% of theory, based on the stearic acid nitrile employed. A sample recrystallized from acetonitrile exhibits a melting point of 50–51° C.

EXAMPLE 22

In accordance with the procedure of Example 1, a distillate is obtained from 54.3 g. of lauric acid nitrile, 18.1 g. of ethanolamine, and 1.15 g. of $$Zn(CH_3COO)_2 \cdot 2H_2O$$

which has a boiling range of 32–146° C./0.1 mm. and contains 41.9 g. of 2-n-undecyl-$\Delta^2$-oxazoline. The yield is 62% of theory, based on the lauric acid nitrile employed. A fraction of the pure $\Delta^2$-oxazoline passes over at 100–103° C./0.1 mm.

EXAMPLE 23

Under nitrogen and agitation, 108 g. of adipic acid dinitrile is heated with 13.4 g. of $Cd(CH_3COO)_2 \cdot 2H_2O$ (cadmium acetate) to 100° C. Then, 122 g. of monoethanolamine is added dropwise in about 30 minutes. The mixture is heated at 100° C. for another 24 hours and is then distilled under an oil vacuum, thus obtaining 143 g. of 2,2′-tetramethylenebis-$\Delta^2$-oxazoline which passes over at 110–120° C./0.1 mm. The yield, based on the adipic acid dinitrile employed, is 73%. The IR spectrum of the compound shows the band of the CN-double bond of the oxazoline ring at 1650 cm.$^{-1}$.

EXAMPLE 24

According to the mode of operation set forth in Example 23, 199 g. of 2,2′-decamethylenebis-$\Delta^2$-oxazoline, B.P. 166–170° C./0.5 mm., is obtained from 192 g. of 1,10-dodecanedioic acid dinitrile, 13.4 g. of $$Cd(CH_3COO)_2 \cdot 2H_2O,$$

and 122 g. of monoethanolamine. The yield, based on the dinitrile employed, is 71%. The IR spectrum of the compound exhibits the band of the CN-double bond at 1650 cm.$^{-1}$.

EXAMPLE 25

According to the procedure set forth in Example 23, 143 g. of 2,2′-tetramethylenebis-5-methyl $\Delta^2$oxazoline, B.P. 111–121° C./0.5 mm., is produced from 108 g. of adipic acid dinitrile, 13.4 g. of $Cd(CH_3COO)_2 \cdot 2H_2O$, and 150 g. of 1-amino-2-propanol. The yield, based on the dinitrile employed, amounts to 64%. The IR spectrum of the compound shows the band of the CN-double bond at 1660 cm.$^{-1}$.

EXAMPLE 26

134 g. of hexahydroterephthalic acid dinitrile, 61 g. of monoethanolamine, and 13.4 g. of $Cd(CH_3COO)_2 \cdot 2H_2O$ are heated under a nitrogen atmosphere for 12 hours to 100° C. Thereafter, another 61 g. of monoethanolamine is added and the mixture heated for 13 hours to 100° C. The reaction product, after cooling, is agitated together with 2.4 l. of 1,2-dichloroethane. The product is then separated from an insoluble, oily component, and the solvent removed by evaporation. After drying the residue on clay plates, one obtains 155 g. of 2,2′-[1,4-cyclohexyl]bis-$\Delta^2$-oxazoline, M.P. 168–172° C. The yield, based on the dinitrile employed, is 70%. The IR spectrum of the compound exhibits the band of the CN-double bond at 1655 cm.$^{-1}$.

EXAMPLE 27

Under a nitrogen atmosphere, 32 g. of terephthalic acid dinitrile is heated with 30.5 g. of ethanolamine and 1.7 g. of $ZnCl_2$ in 120 ml. of anhydrous chlorobenzene for 25 hours to 130° C. The reaction solution, decanted in the hot state from an insoluble component, produces a crystalline precipitate upon cooling. The crystals are vacuum-filtered and washed with chlorobenzene and petroleum ether. By extracting the residue insoluble in the reaction solution with 30 ml. of hot chlorobenzene, further crystals are obtained. In total, 33 g. of pure 2,2′-p-phenylenebis[$\Delta^2$-oxazoline] is produced, M.P. 238–239° C. The yield, based on the terephthalic acid dinitrile utilized amounts to 61% of theory.

EXAMPLE 28

Under nitrogen, 32 g. of isophthalic acid dinitrile, 30.5 g. of ethanolamine, and 1.7 g. of $ZnCl_2$ are heated in 120 ml. of dry chlorobenzene for 18 hours to 130° C. Then, the hot solution is decanted from the insoluble residue and the solvent removed under vacuum. From the solid residue, one obtains, by recrystallization from cyclohexane, 31.7 g. of 2,2′-phenylenebis[$\Delta^2$-oxazoline]. The yield, based on the isophthalic acid dinitrile employed, is 58% of theory.

Calculated: C, 66.65; H, 5.59; N, 12.96. Found: C, 67.16; H, 5.28; N, 13.74.

EXAMPLE 29

Under nitrogen, 32 g. of terephthalic acid dinitrile, 37.5 g. of 1-amino-3-propanol, and 2.74 g. of $$Zn(CH_3COO)_2 \cdot 2H_2O$$

are heated in 120 ml. of dry chlorobenzene for 18 hours to 130° C. Then, the hot solution is decanted from the insoluble residue and, after standing for 24 hours at room temperature, the thus-separated crystallized product is vacuum-filtered. After recrystallization from n-butyl acetate, one obtains 18 g. of 2,2′-p-phenylenebis[5,6-dihydro-4H-1,3-oxazine], M.P. 214–216.5° C. The yield, based on the terephthalic acid dinitrile employed, amounts to 30% of theory.

Calculated: C, 68.83; H, 6.60; N, 11.47. Found: C, 68.19; H, 6.72; N, 11.28.

COMPARATIVE EXAMPLE 1

In accordance with the mode of operation disclosed in Example 1—but without the addition of catalyst—a distillate is obtained from 206 g. of benzonitrile and 122 g. of ethanolamine which has a boiling range of 62–120° C./9 mm. and contains 79 g. of 2-phenyl-$\Delta^2$-oxazoline. The yield is 65% of theory, based on the reacted benzonitrile, the conversion is 41%.

COMPARATIVE EXAMPLE 2

82 g. of anhydrous acetonitrile is refluxed under a nitrogen atmosphere with 122 g. of ethanolamine for 25 hours. From the reaction residue, one obtains a distillate of a boiling range of 78–171° C., containing 3 g. of 2-methyl-$\Delta^2$-oxazoline. This corresponds to a yield of 2% of theory, based on the acetonitrile employed.

COMPARATIVE EXAMPLE 3

58 g. (0.565 mol) of benzonitrile is heated with 34.5 g. (0.565 mol) of ethanolamine and 0.7 g. of sodium methylate under a nitrogen atmosphere for 12 hours to 130° C. From the reaction product which, after cooling, yields a white solid precipitate, a distillate is obtained having a boiling range of 35–150° C. and containing 13.5 g. of 2-phenyl-Δ²-oxazoline. The yield is 27% of theory, based on the reacted benzonitrile, at a conversion of 60%.

The solid substance, separated after cooling of the reaction charge, can be isolated (3 g.) and can be identified as 2,4,6-triphenyl-1,3,5-triazine.

EXAMPLE 30

With the use of the same catalyst concentration and experimental conditions as in Comparative Example 3, 103 g. of benzonitrile is heated under a nitrogen atmosphere with 61 g. of ethanolamine and 3.3 g. of $$Cd(CH_3COO)_2 \cdot 2H_2O$$

for 12 hours to 130° C. From the reaction residue, a distillate is obtained having a boiling range of 100–125° C./12 mm., containing 131 g. of 2-phenyl-Δ²-oxazoline. The yield, based on reacted benzonitrile, amounts to 92% of theory; the conversion in this case amounts to 97%.

COMPARATIVE EXAMPLE 4

93 g. of anhydrous acetonitrile, 138 g. of ethanolamine, and 2.8 g. of sodium methylate are refluxed for 12 hours under a nitrogen atmosphere. From the reaction residue, one obtains a distillate having a boiling range of 81–160° C. and containing 1 g. of 2-methyl-Δ²-oxazoline. The yield, based on the acetonitrile employed, amounts to 0.5% of theory.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a cyclic imidic acid ester which comprises heating at 50–180° C. a mixture of an aminoalkanol of the formula

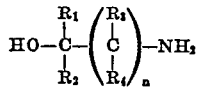

wherein $R_1$, $R_2$, $R_3$ and $R_4$ each are a hydrogen atom or alkyl of 1–4 carbon atoms and $n$ is the integer 1 or 2, and an organic nitrile selected from the group consisting of (a) a carboxylic acid mononitrile of the formula $$R{-}C{\equiv}N$$

wherein R is alkyl, cycloalkyl of up to 22 carbon atoms aralkyl of 7–10 carbon atoms, aryl containing 6 or 10 ring carbon atoms, or a heterocyclic ring of 4–9 carbon atoms;

(b) an aliphatic dicarboxylic acid dinitrile of the formula

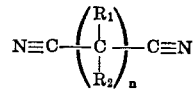

wherein $R_1$ and $R_2$ each are a hydrogen atom or methyl and $n$ is an integer from 3 to 19;

(c) a cycloaliphatic dicarboxylic acid dinitrile of the formula

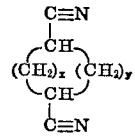

wherein $x$ is an integer from 1 to 3 and $y$ is an integer from 1 to 2; and (d) an aryl dinitrile in which the aryl group contains 6 or 10 ring carbon atoms and the nitrile groups are separated from each other by at least 3 carbon atoms, and in the presence as reaction catalyst of $10^{-5}$ to $10^{-1}$ mole per mole of nitrile group of a salt of lithium, copper, calcium, zinc, cadmium manganese, nickel or cobalt, whose anion renders the salt soluble in the reaction mixture, and removing the thus-produced ammonia from the reaction mixture.

2. A process according to claim 1, wherein the organic nitrile is an aliphatic dicarboxylic dinitrile in which $R_1$ and $R_2$ each are a hydrogen atom.

3. A process according to claim 1, wherein the organic nitrile is an aliphatic dicarboxylic dinitrile in which $n$ is an integer from 4 to 10.

4. A process according to claim 5, the reaction is conducted at a temperature of 70–130° C.

5. A process according to claim 1, wherein the catalyst is selected from the group consisting of lithium chloride, copper (II) sulfate, calcium chloride, zinc chloride, zinc bromide, zinc iodide, zinc acetate, cadmium acetate, manganese acetate, nickel acetate and cobalt acetate.

6. A process according to claim 1, the reaction is conducted at a temperature of 70–130° C.

References Cited

FOREIGN PATENTS 167,100   11/1950   Austria _____ 260—309

HARRY I. MOATZ, Primary Examiner

U.S. Cl. X.R.

260—88.3 R, 246 R, 248 CS, 307 F